UNITED STATES PATENT OFFICE

TRUMAN B. WAYNE, OF HOUSTON, TEXAS

METHOD OF RESOLVING PETROLEUM EMULSIONS

No Drawing.   Application filed May 21, 1931. Serial No. 539,127.

This invention relates to a method of resolving petroleum emulsions of the character commonly encountered in the production, handling and refining of petroleum.

The principal object of this invention is to provide an improved process and reagents for treating petroleum emulsions to separate them into their component parts of oil and water.

The new series of resolving agents contemplated by the present invention may be considered broadly as modified or substituted organic amines. More particularly, the preferred reagents of this series of treating compounds may be considered as soap-forming body derivatives of primary diamines, alkylene diamines, and tertiary alkylamines, the soap-forming bodies which enter into the reaction to produce the treating agents preferably being selected from the group comprising fatty acids, modified fatty acids such as sulfuric esters of hydroxy fatty acids, naphthalene and petroleum sulfonic acids and their nuclear-substituted derivatives, and the like.

In the preferred embodiments of the invention, the organic amines preferably employed as starting materials are substituted with alkyl, cyclo-alkyl, aryl, or arylalkyl groups, the substituted amines subsequently being acylated with an acid capable of yielding therefrom a water-soluble salt, preferably a fatty acid containing more than eight carbon atoms. In the first embodiment of the invention described below the resulting acyl derivatives of the substituted amines are reacted with a soap-forming body such as a sulfonated fatty acid.

Modified fatty acids prepared by the sulfonation of various fatty acids and their esters, and their sodium, potassium and ammonium salts, or "soaps", have been suggested for the use in resolving petroleum emulsions and various patents have been granted on reagents of this general type. Moreover, modified fatty acid reagents of the "Twitchell" type, characterized by having one soap-forming carboxyl group for each aromatic radical, and similar sulfo-aromatic compounds, have also been used in the treatment of petroleum emulsions. However, in the case of all of the compounds of this nature hitherto proposed, either the acid body, the ester with alcohol, or ammonium salts, have been employed as the demulsifying agents. The products contemplated by the present invention are clearly distinguished in structural formulæ, composition, and physical characteristics from the modified fatty acid compounds hitherto employed in the treatment of petroleum emulsions. I do not make any claim to the use of modified fatty acids, such as sulfonated fatty acids and their esters and metallic salts, either alone or when condensed with aromatic bodies.

In the first embodiment of the present invention an alkylene diamine, such as ethylene diamine, is employed as the starting material. The relatively recent production of ethylene dichlorid and ethylene chlorhydrin on a commercial scale at low prices has made feasible the production of organic bases at prices which will allow their use in many commercial products. For example, the manufacture of ethylene diamine is now accomplished by combining ethylene dichlorid and anhydrous ammonia under pressure without the aid of catalysts. A product suitable as a starting material for the purpose hereinafter disclosed may be thus made without purification other than distilling off the excess of ammonia and the removal of the ammonium chlorid.

By the substitution of alkyl, cyclo-alkyl, aryl, and arylalkyl radicals for the replaceable hydrogen atoms of primary amines such as alkylene diamines, they may be converted into secondary and tertiary amines by any of the well known methods such, for example, as by warming molecular proportions of ethylene diamine with potassium alkyl sulfates, or alkyl sulfates and an alkali. Tertiary amines may be converted into quaternary ammonium compounds by heating with an alkylating agent such as alkyl halides, sulfates or the like. The substituted ethylene diamine so produced is still strongly basic and may be acylated by heating at least one molecular proportion of the diamine with one molecular proportion of fatty acid. If, for example, two alkyl groups have been substituted into the amino groups of the diamine, the disubstituted diamine can yet be substituted with one or two acyl radicals and still retain its basic qualities. The base so prepared is insoluble in water but will form water-soluble salts with many inorganic and organic acids. If greater stability toward alkalis is required, the base may be heated with an alkyl halide, sulfate or the like to convert it into a quaternary ammonium base which is highly stable in acid or alkaline waters is completely soluble, and possesses great lathering qualities. In the preferred practice of preparing this quaternary ammonium base, I employ an acid alkyl sulfate such as dimethyl sulfate or the corresponding acid sulfates of propyl, butyl, or amyl alcohols.

In the treating of petroleum emulsions, the effect of these acyl derivatives of substituted alkylene diamines on the surface tension at the water-oil interface in the emulsions is so great that resolution of these emulsions is effected by extremely small quantities of my new treating agent. Moreover, the presence of brine in the emulsion causes the precipitation of this new treating agent in colloidal hydrated form, which is highly desirable in that this colloid segregates at the interface of the water-in-oil emulsion and causes a quick resolution thereof into its component parts of mineral oil and water.

In the preparation of a resolving agent of the above referred to character which is highly efficient in resolving petroleum emulsion it is not necessary or expedient from the standpoint of manufacturing costs to proceed with the alkylation of the amine according to classic procedures, although such procedure is, of course, considered within the scope of the present invention. For example, I prefer to prepare an acid alkyl sulfate by adding concentrated sulfuric acid, oleum, or chlorosulfonic acid, or a combination of these, to an excess of an aliphatic alcohol, preferably butyl alcohol, while cooling the reaction mixture to prevent the temperature from rising above 85° C. Slightly more than the theoretical amount of alcohol is preferably used so that an excess of alcohol will be present in the finished batch of acid alkyl sulfate. A quantity of the acid alkylsulfate mixture thus produced corresponding to about two moles of actual acid alkyl sulfate is slowly added to a quantity of the ethylene diamine solution, prepared as described above, corresponding to one mole of ethylene diamine. The resulting mixture is then warmed until reaction is complete. The unsymmetrical dialkyl ethylene diamine (dibutylethylene diamine) thus produced is thereafter preferably acylated with a fatty acid, preferably one which contains more than eight carbon atoms. In actual practice, one mole of oleic, linoleic, ricinoleic, or fatty acid, is heated with the substituted diamine at about 200° C. for several hours until a thick, oily substance is produced. The water present may be distilled off under vacuum, but this is not necessary at this stage of the process. The foregoing procedure produces a complex base which readily lends itself to the preparation of a great variety of treating agents, several specific examples of which are hereinafter set forth for the purposes of illustration.

*Example 1*

A product of the above referred to character, consisting of an acyl derivative of an alkylated alkylene diamine, such, for example, as oleyl-dibutylethylene diamine, is then combined with from 10 to 60 per cent. of its volume of sulfonated castor oil, sulfonated oleic acid, or other similar sulfonated fatty body, and heated for a short period at about 100° C., and finally to approximately 200° C. for about three hours or longer to form products which contain the carboxyl group intact, or, owing to their basic properties combine with acids to form salts.

*Example 2*

400 parts of oleyl-dibutylethylene diamine are warmed with 150 parts of an acid alkyl sulfate, such as dimethyl sulfate or dibutyl sulfate, to convert the base into a quaternary ammonium compound which is very soluble in water and possesses marked lathering qualities.

*Example 3*

400 parts of a quaternary base, such as that prepared according to the preceding example, are heated with from 10 to 60 parts of a sulfonated fatty body, such as Turkey red oil, first at about 100° C. and finally at 200° C. for several hours. The resulting material may be used as such as a resolving agent or may be saponified.

*Example 4*

450 parts of the quaternary base prepared according to Example 2 are condensed with 200 parts of an aromatic sulfonic acid or its nuclear-substituted derivatives, for example, butylnaphthalene sulfonic acid. The resulting product is very soluble in water and is unusually effective in resolving petroleum emulsions.

It will be readily apparent that a great variety of salts of the above described derivatives of an alkylene diamine notably ethylene diamine, can be prepared, many of which are particularly effective for breaking petroleum emulsions. The examples set forth are merely illustrative of a few of these possible combinations, and it is to be understood that the invention is not limited to the several examples described.

*Example 5*

One mole of an alkyl amine, such as a secondary or tertiary amine, and preferably trimethylamine, is treated with a molecular proportion of a sulfuric ester of a hydroxy fatty acid, such as sulfonated castor oil, in the presence of a small amount of a suitable catalyst, e. g. copper dust or pyridine, to effect reaction first at ordinary temperatures and thereafter at about 110°–125° C. under pressure. The product thus obtained contains the carboxyl group intact and may be saponified or, owing to its basic properties, may be combined with acids to form salts. I have found that the acylated derivatives of this product are markedly effective treating agents for the resolution of petroleum emulsions.

*Example 6*

200 parts of the product prepared according to Example 5 are condensed with from 200 to 500 parts of an alkylated aromatic sulfonic acid, preferably dibutylnaphthalene disulfonic acid, by warming at approximately 40° C. for about one hour. The resulting acid mass may be used as such for the resolving of petroleum emulsions or it may be converted into its ammonium, sodium, or potassium salt for use as a resolving agent.

While an attempt has been made to trace the course of the chemical reactions involved in the preparation of my improved treating agents, and some data regarding their structural composition has been offered, it is to be understood that the invention is not dependent on any theory expressed herein as to the course of the reactions or as to the nature of the products except as defined in the appended claims.

The improved treating agents prepared in accordance with the present invention may be used in resolving petroleum emulsions in the proportion of one part of the treating agent to from 2,000 to 50,000 parts of the emulsion, either by adding the concentrated product directly to the emulsion or after diluting with water or oil in the conventional manner. As will be apparent, the reagent may be employed in any of the numerous ways and in any conventional form of apparatus in which resolving agents are customarily employed in the treating of emulsions.

The term "water-soluble" as employed herein is intended to include the property of forming colloidally hydrated aqueous solutions, as well as the property of possessing true solubility in water.

The term "substituted" as referring to organic amines is to be understood as referring to amines in which one or more alkyl, cyclo-alkyl, aryl, or aryl-alkyl group has been substituted.

The term "modified" as referring to a fatty body such as a fatty acid is to be understood to include sulfonated fatty bodies and also equivalents thereof such as fatty bodies which have been chlorinated, brominated or the like.

The term "soap-forming body" is intended to include fatty acids, modified fatty acids such as sulfuric esters or hydroxy fatty acids, naphthalene and petroleum sulfonic acids and their nuclear-substituted derivatives, and the like.

While I have described in detail the preferred embodiments of my invention it is to be understood that the ingredients employed, the proportions of ingredients, the arrangement of steps, and the details of procedure may be variously modified without departing from the spirit of the invention or the scope of the subjoined claims.

I claim:

1. The process of resolving water-in-oil emulsions which comprises adding thereto a water-soluble salt of an acylated derivative of a substituted alkylene diamine.

2. The process of resolving water-in-oil emulsions which comprises adding thereto the reaction product of a substituted alkylene diamine, an acylating agent, and a soap-forming body.

3. The process of resolving water-in-oil emulsions which comprises adding thereto the reaction product of a substituted alkylene diamine, an acylating agent, and an acid which yields a water-soluble salt.

4. The process of resolving water-in-oil emulsions which comprises adding thereto the reaction product of a substituted alkylene diamine and a fatty acid containing more than eight carbon atoms.

5. The process of resolving water-in-oil emulsions which comprises adding thereto the reaction product of a substituted alkylene diamine, a fatty acid containing more than eight carbon atoms, and an acid which yields a water-soluble salt.

6. The process of resolving water-in-oil emulsions which comprises adding thereto the reaction product of a substituted alkylene diamine, a fatty acid containing more than eight carbon atoms, and a modified acid of the fatty series containing both a sulfo and a carboxyl group.

7. The process of resolving water-in-oil emulsions which comprises adding thereto the reaction product of an alkylene diamine, an alkylating agent, an acylating agent, and a soap-forming body.

8. The process of resolving water-in-oil emulsions which comprises adding thereto the reaction product of an alkylene diamine, an alkylating agent selected from the group comprising alkyl sulfates and alkyl halides, and acylating agent, and a soap-forming body.

9. The process of resolving water-in-oil emulsions which comprises adding thereto the reaction product of an alkylene diamine, an alkylating agent selected from the group comprising alkyl sulfates and alkyl halides, a fatty acid containing more than eight carbon atoms, and a soap-forming body.

10. The process of resolving water-in-oil emulsions which comprises adding thereto the reaction product of an alkylene diamine, an alkylating agent selected from the group comprising alkyl halides and alkyl sulfates, a fatty acid containing more than eight carbon atoms, and a sulfonated fatty body.

11. The process of resolving water-in-oil emulsions which comprises adding thereto the complex water-soluble salt of a substituted alkylene diamine, a fatty acid of the oleic series, a greater than stoichiometrical proportion of sulfonated fatty acid, and sufficient alkali to neutralize the excess of sulfonated fatty acid.

12. The process of resolving water-in-oil emulsions which comprises adding thereto the water-soluble reaction product of a substituted alkylene diamine, a fatty acid containing more than eight carbon atoms, and an aromatic sulfonic acid.

13. The process of resolving water-in-oil emulsions which comprises adding thereto the water-soluble reaction product of an alkylene diamine, a fatty acid containing more than eight carbon atoms, and a nuclear-substituted aromatic sulfonic acid.

14. The process of resolving water-in-oil emulsions which comprises adding thereto the water-soluble reaction product of an alkylene diamine, an alkylating agent selected from the group comprising alkyl sulfates and alkyl halides, a fatty acid containing more than eight carbon atoms, and an acid selected from the group comprising aromatic sulfonic acids and nuclear-substituted aromatic sulfonic acids.

15. The process of resolving water-in-oil emulsions which comprises adding thereto the reaction product of an acyl derivative of alkylated ethylene diamine and a modified fatty body.

16. The process of resolving water-in-oil emulsions which comprises adding thereto the reaction product of an acyl derivative of an alkylated alkylene diamine and a soap-forming body.

17. The process of resolving water-in-oil emulsions which comprises adding thereto the reaction product of oleyl-dibutylethylene diamine and a sulfonated fatty body.

18. The process of resolving water-in-oil emulsions which comprises adding thereto a water-soluble quaternary ammonium compound resulting from the interaction of an acylated derivative of a tertiary alkylene diamine and an alkyl compound selected from the group comprising alkyl halides and alkyl sulfates.

19. The process of resolving water-in-oil emulsions which comprises adding thereto a water-soluble quaternary ammonium compound resulting from the interaction of an acyl derivative of a substituted alkylene diamine and an alkyl compound selected from the group comprising alkyl halides and alkyl sulfates.

20. The process of resolving water-in-oil emulsions which comprises adding thereto a water-soluble reaction product of a soap-forming body and a quaternary ammonium compound prepared by the interaction of an acyl derivative of a substituted alkylene diamine and an alkyl compound selected from the group comprising alkyl sulfates and halides.

21. The process of resolving water-in-oil emulsions which comprises adding thereto a water-soluble reaction product of sulfonated fatty acid and a quaternary ammonium compound prepared by the interaction of an acyl derivative of a substituted alkylene diamine and an alkyl compound selected from the group comprising alkyl sulfates and halides.

22. The process of resolving water-in-oil emulsions which comprises adding thereto the water-soluble reaction product of an acid selected from the group comprising aromatic sulfonic acids and nuclear-substituted aromatic sulfonic acids, and a quaternary ammonium compound prepared by the interaction of an acyl derivative of a substituted alkylene diamine and an alkyl compound selected from the group comprising alkyl sulfates and halides.

23. The process of resolving water-in-oil emulsions which comprises adding thereto the reaction product of oleyldibutylethylene diamine and an acid alkyl sulfate.

24. The process of resolving water-in-oil emulsions which comprises adding thereto the reaction product of oleyldibutylethylene diamine and an acid alkyl sulfate and a soap-forming body.

25. The process of resolving water-in-oil emulsions which comprises adding thereto the reaction product of a sulfuric ester of a hydroxy fatty acid and an amine selected from the group consisting of secondary and tertiary alkyl amines.

26. The process of resolving water-in-oil emulsions which comprises adding thereto the reaction product of an amine selected from the group consisting of secondary and tertiary alkyl amines, a sulfuric ester of a hydroxy fatty acid, and an alkali.

27. The process of resolving water-in-oil emulsions which comprises adding thereto the reaction product of an alkyl amine, an alkylating agent selected from the group comprising alkyl sulfates and halides, a sulfuric ester of a hydroxy fatty acid, and an acid which yields therefrom a water-soluble salt.

28. The process of resolving water-in-oil emulsions which comprises adding thereto the reaction product of an alkyl amine, an alkylating agent selected from the group comprising alkyl sulfates and halides, a sulfuric ester of a hydroxy fatty acid, and an aromatic sulfonic acid.

29. The process of resolving water-in-oil emulsions which comprises adding thereto the reaction product of an alkylated or arylalkylated derivative of ethylene diamine, at least one mole of a fatty acid selected from the group of which oleic and ricinoleic acids are typical, and from 10 to 60 per cent. of a fatty body selected from the group consisting of sulfonated oleic acid and sulfonated castor oil.

30. The process of resolving water-in-oil emulsions which comprises adding thereto the reaction product of an alkylated or arylalkylated derivative of ethylene diamine, at least one mole of a fatty acid of the group of which oleic and ricinoleic acids are typical, an excess of a sulfonated fatty acid of the oleic series, and alkali in an amount sufficient to neutralize the excess of sulfonated fatty acid.

31. The process of resolving water-in-oil emulsions which comprises adding thereto the reaction product of an alkylated or arylalkylated derivative of ethylene diamine, at least one mole of a fatty acid selected from the group of which oleic and ricinoleic acids are typical and an acid compound selected from the group comprising alkylated aromatic sulfonic acids and substituted derivatives thereof.

32. The process of resolving water-in-oil emulsions which comprises adding thereto the reaction product of an alkylated or arylalkylated derivative of ethylene diamine, at least one mole of a fatty acid selected from the group of which oleic and ricinoleic acids are typical, and butylnaphthalene sulfonic acid.

33. The process of resolving water-in-oil emulsions which comprises adding thereto the reaction product of trimethylamine and a sulfonated fatty body.

34. The process of resolving water-in-oil emulsions which comprises adding thereto the reaction product of trimethylamine and sulfonated castor oil.

35. The process of resolving water-in-oil emulsions which comprises adding thereto a water-soluble reaction product of trimethylamine, sulfonated castor oil, and an alkali.

36. The process of resolving water-in-oil emulsions which comprises adding thereto the water soluble condensation product of trimethylamine, a sulfonated fatty body selected from the group comprising a sulfonated oleic acid or sulfonated castor oil, and an aromatic sulfonic acid or a nuclear-substituted derivative thereof.

37. The process of resolving water-in-oil emulsions which comprises adding thereto the water-soluble potassium, sodium, or ammonium salt of the condensation product of trimethylamine, a sulfonated fatty body selected from the group comprising a sulfonated oleic acid or sulfonated castor oil, and an aromatic sulfonic acid or a nuclear-substituted derivative thereof.

38. The process of resolving water-in-oil emulsions which comprises adding thereto a water-soluble quaternary ammonium compound prepared by the interaction of an amine selected from the group comprising secondary and tertiary amines, a sulfuric ester of a hydroxy fatty acid, and an acid alkyl sulfate.

In testimony whereof I affix my signature.
TRUMAN B. WAYNE.